United States Patent
Lu et al.

(10) Patent No.: US 10,934,381 B2
(45) Date of Patent: Mar. 2, 2021

(54) COMPOSITION AND METHOD OF MAKING TWO-WAY SHAPE MEMORY POLYMER BASED SEALANT

(71) Applicants: Lu Lu, Baton Rouge, LA (US); Jinbao Cao, Baton Rouge, LA (US); Guoqiang Li, Baton Rouge, LA (US)

(72) Inventors: Lu Lu, Baton Rouge, LA (US); Jinbao Cao, Baton Rouge, LA (US); Guoqiang Li, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 101 days.

(21) Appl. No.: 16/278,915

(22) Filed: Feb. 19, 2019

(65) Prior Publication Data
US 2019/0256634 A1   Aug. 22, 2019

Related U.S. Application Data

(60) Provisional application No. 62/801,731, filed on Feb. 6, 2019, provisional application No. 62/632,615, filed on Feb. 20, 2018.

(51) Int. Cl.
| | | |
|---|---|---|
| C08F 236/06 | (2006.01) | |
| C09J 133/14 | (2006.01) | |
| C08K 5/14 | (2006.01) | |
| C08K 5/47 | (2006.01) | |
| C08K 5/00 | (2006.01) | |
| E04B 1/68 | (2006.01) | |

(52) U.S. Cl.
CPC .......... *C08F 236/06* (2013.01); *C08K 5/0025* (2013.01); *C08K 5/14* (2013.01); *C08K 5/47* (2013.01); *C09J 133/14* (2013.01); *C08F 2810/20* (2013.01); *E04B 1/68* (2013.01)

(58) Field of Classification Search
CPC .............................. C08F 236/06; C08L 95/00
See application file for complete search history.

(56) References Cited

FOREIGN PATENT DOCUMENTS

JP      S4935445 A  *  4/1974

OTHER PUBLICATIONS

Machine translation of JP-S4935445-A (Year: 1974).*
DD146222A, Jan. 1981.*
DD205178A, Dec. 1983.*
DD267987, May 1989.*
J. Yin et al., "Using a polymer-based sealant material to make crack repair of asphalt pavement," *J. Testing and Evaluation* 2018, vol. 46, No. 5.
D. Shen et al., "Synthesis and performance evaluation of epoxy resin-modified shape memory polyurethane Sealant," *J. Testing and Evaluation* 2018, vol. 46, No. 4.
D. Shen et al., "Development of shape memory polyurethane base sealant for concrete pavement," *Construction and Building Materials* 2018, vol. 174, pp. 474-483.
L. Lu et al., "One-way multishape-memory effect and tunable two-way shape memory effect of ionomer poly(ethylene-co-methacrylic acid)," *ACS Applied Materials and Interfaces*, vol. 8, pp. 14812-14823 (2016).
L. Lu et al., "A polycaprolactone-based syntactic foam with bidirectional reversible actuation," *J. Applied Polymer Science* (2017) vol. 134, p. 45225.
G. Li et al., "Thermomechanical characterization of shape memory polymer-based self-healing syntactic foam sealant for expansion joints," *J. Transportation Engineering* (2011) vol. 137, pp. 805-814.
L. Lu et al., "Giant reversible elongation upon cooling and contraction upon heating for a crosslinked *cis* poly(1,4-butadiene) system at temperatures below zero Celsius," *Scientific Reports* (2018) 8:14233.
G. Li et al., Jun. 2018 NSF poster.

* cited by examiner

*Primary Examiner* — Wenwen Cai
(74) *Attorney, Agent, or Firm* — John H. Runnels

(57) ABSTRACT

A sealant composition and method for its manufacture are disclosed. A two-way shape memory polymer (2W-SMP) sealant expands upon cooling and contracts upon heating, and thus provides improved sealing for pavements and other structures. The base resin for the sealant is polybutadiene with a high cis content. Uses for the sealant include, but are not limited to: sealant for expansion joint, contraction joint, or construction joint in cement concrete pavement; sealant or sealer for transverse cracks or block cracks in cement concrete pavement or asphalt concrete pavement; sealant for pipelines, lightweight composite structures, roofs, buildings, bridge decks, dams, offshore platforms; sealant for other structures and devices that have previously typically used polymer sealants.

20 Claims, No Drawings

COMPOSITION AND METHOD OF MAKING TWO-WAY SHAPE MEMORY POLYMER BASED SEALANT

The benefit of the filing dates of provisional application 62/632,615, filed Feb. 20, 2018; and of provisional application 62/801,731, filed Feb. 6, 2019 are claimed under 35 U.S.C. § 119(e). The complete disclosures of both priority applications are hereby incorporated by reference in their entirety.

This invention was made with Government support under SBIR Phase I grant number 1647650 awarded by the National Science Foundation. The Government has certain rights in this invention.

TECHNICAL FIELD

This application pertains to compositions and methods of making two-way shape memory polymer based sealants, useful, for example, in joints and cracks of asphalt concrete and cement concrete.

BACKGROUND

Joints and cracks cannot be avoided in pavement and other structures due to thermal loading, mechanical loading, and environmental attacks. If structures are not properly sealed, water penetration can damage the surface layer and the layers beneath; and entrapped debris can then lead to rupture of the structure. Therefore, sealing cracks and joints is a common practice to maintain or extend structure service life. The core reason for most joint and crack failures is that almost all sealants, including silicone rubber, polyurethane, hot poured asphalt, cold poured asphalt, polymer modified asphalt, etc., have thermal responses generally similar to that of concrete, i.e., they contract upon cooling and expand upon heating. There is an unfilled need for improved sealants with improved thermal properties, sealants with opposite temperature responses in the ranges of temperatures typically seen when a structure is in service.

J. Yin et al., "Using a polymer-based sealant material to make crack repair of asphalt pavement," *J. Testing and Evaluation* 2018, vol. 46, no. 5 discloses the use of polymer-based sealants to repair cracks in asphalt pavement. Bonding was deemed satisfactory at 0° C. to 5° C. However, brittle failure occurred at low temperatures and viscoelastic failure at high temperatures. The polymer sealant was based on a mixture of epoxy acrylate, polyurethane, and methyl methacrylate, with a crosslinking agent.

D. Shen et al., "Synthesis and performance evaluation of epoxy resin-modified shape memory polyurethane sealant," *J. Testing and Evaluation* 2018, vol. 46, no. 4 discloses tests concerning the effects of epoxy resin on shape memory polyurethane used as a sealant for concrete pavement joints.

D. Shen et al., "Development of shape memory polyurethane base sealant for concrete pavement," *Construction and Building Materials* 2018, vol. 174, pp. 474-483 discloses tests concerning the effects of titanium dioxide on shape memory polyurethane used as a sealant for concrete pavement joints.

L. Lu et al., "One-way multi shape memory effect and tunable two-way shape memory effect of ionomer poly (ethylene-co-methacrylic acid)," *ACS Applied Materials and Interfaces*, vol. 8, pp. 14812-14823 (2016) discloses that the ionomer Surlyn™ 8940 exhibits both a one-way multishape memory effect and tunable two-way reversible actuation. Surlyn™ is a commercial thermoplastic ionomer resin from DuPont. It is a semicrystalline random copolymer consisting of poly(ethylene-co-methacrylic acid), partially neutralized with metal ions. A permanently cross-linked network is provided by ionic clusters in the ionomer, and a temporary network by polyethylene crystalline domains. Possible suggested applications included uses such as actuators, fixators, sealants, and artificial muscles.

L. Lu et al., "A polycaprolactone-based syntactic foam with bidirectional reversible actuation," *J. Applied Polymer Science* (2017) vol. 134, p. 45225 discloses that a cross-linked polycaprolactone foam incorporating glass microspheres exhibited a two-way shape memory effect. Possible suggested applications included uses such as biomedical devices, soft robots, aircrafts, and sealants.

G. Li et al., "Thermomechanical characterization of shape memory polymer-based self-healing syntactic foam sealant for expansion joints," *J. Transportation Engineering* (2011) vol. 137, pp. 805-814 discloses the use of shape memory polymer-based sealants for expansion joints, specifically a styrene-based thermoset with dispersed hollow glass microspheres.

DISCLOSURE OF INVENTION

We have discovered a novel sealant composition and method for its manufacture. A novel two-way shape memory polymer (2W-SMP) sealant expands upon cooling and contracts upon heating, and thus provides an improved solution to the century-long problem of the need for improved sealing for pavements and other structures.

In one embodiment the base resin was cis-polybutadiene, which can be cured for example with 1%-5% dicumyl peroxide (DCP). The cis-polybutadiene used in a prototype embodiment had a high cis content (97%), and a high viscosity: 46 (Mooney ML 1+4 at 100° C.). The sealant may be synthesized, for example, by a solution-based method with evaporation of solvent, or by a solid-based method through batch mixing/compounding. Our successful results with solid compounding suggest the feasibility of upscaling the method for industrial-scale production. After curing, the chemically cross-linked network displayed a two-way shape memory effect (2W-SME), with the crosslinking points acting as the net points and the crystallization/melting transition acting as the switching phase. This semicrystalline polymer became a 2W-SMP and exhibited excellent 2W-SME behavior.

Attributes of the prototype embodiment of the novel smart sealant included the following: (1) The sealant expanded by 106% when the temperature dropped from 60° C. to −45° C., while it contracted by 101% when the temperature rose from −45° C. to 60° C. (by convention, the % contraction is based on the programmed or stretched length, and thus can exceed 100%). (2) The material can be used as a sealant in joints or in crack repair. (3) It had good fatigue resistance even at the very low temperature of −35° C. There was no sign of fatigue failure under a cyclic strain of −30%~30% after 8,500 load repetitions. (4) The prototype sealant displayed self-healing capability. A crack within the sealant could be self-healed (fractured pieces restored to integrity by simple kneading), eliminating or ameliorating failure of cohesion. (5) It had good durability under environmental attacks such as UV radiation, rain, saltwater, and their combinations. (6) It can be installed easily. There is no special requirement for the geometrical shape of the joint/crack, nor for the installation temperature. (7) It can be directly inserted into an open space as large or small particles, without the need for a purposely-applied tension programming step, because naturally-occurring outdoor temperature drops sufficed to induce the tensile stress needed to trigger the two-way shape memory effect (2W-SME). (8) Since the 2W-SME of the pure sealant exceeded typical needs for pavement, asphalt or other additives may optionally be introduced into the sealant to lower cost, increase UV stability, and the like. (9) With a 40 wt % 2W-SMP content, a prototype asphalt-based sealant showed ~40% expansion when the temperature dropped from room temperature to −45° C. Furthermore, it had high tensile strength at room temperature (~0.9 MPa), at cold temperatures (e.g., −40° C., ~8.0 MPa), and at hot temperatures (e.g., 50° C., ~0.4 MPa). In addition to the 2W-SME, the asphalt-modified sealant exhibited high ductility (~640% at 50° C., ~820% at room temperature, and ~500% at −40° C.), comparable to other elastomeric sealants. As the temperature drops, the tensile stress produced by the pavement contraction pulls on the sealant. Due to the sealant's high ductility, the stretching should not cause adhesive or cohesive failure in the sealant. This is because the tensile stress also triggers the 2W-SME, and the stretched sealant thus expands on its own as temperature drops, thereby reducing tensile stress. By contrast to other elastomeric sealants, which generally experience a monotonic increase in tensile stress as the temperature drops, the novel sealant should experience a reduction in stress once the 2W-SME is triggered, thus avoiding adhesive and cohesive failure. (10) With proper programming, the sealant exhibited true 2W-SME, without external loading. (11) With proper programming, the sealant also demonstrated advanced 2W-SME, i.e., it expanded under an external compressive load when the temperature dropped.

Uses of the novel sealant include, but are not limited to: sealant for expansion joint, contraction joint, or construction joint in cement concrete pavement; sealant or sealer for transverse cracks or block cracks in cement concrete pavement or asphalt concrete pavement; sealant for pipelines, lightweight composite structures, roofs, buildings, bridge decks, dams, offshore platforms; sealant for other structures and devices that have previously typically used polymer sealants.

The invention is useful in roads, bridges, and other transportation infrastructure. Joints are usually intentionally constructed to allow movement of structural elements due to thermal expansion or contraction when the temperature rises or falls. Cracks are a common failure mode in pavements. If cracks are not properly sealed, water penetration can damage the surface layer and the layers beneath, and entrapped debris and expansion of water as it freezes can lead to ruptures in the concrete. Various types of sealants have previously been used. Unfortunately, many sealants cannot properly seal cracks and joints, or they have short lifetimes, requiring frequent replacement or resealing. We have discovered a two-way shape memory smart sealant that expands upon cooling and contracts upon heating, which is opposite to the thermal behavior of concrete or asphalt, to counteract thermal movement of the joined structural elements, and to maintain better seals.

Prototype embodiments of the novel smart sealant displayed the following properties:

1. Working temperature of the 2W-SME covered at least the range from −45° C. to 60° C., which covers the temperature range encountered in most parts of the United States and in the rest of the world. With a 40 wt % 2W-SMP content, a prototype asphalt-based sealant showed ~40% expansion as the temperature dropped from room temperature to −45° C. Furthermore, it had high tensile strength at room temperature (~0.9 MPa), at cold temperatures (e.g., −40° C., ~8.0 MPa), and at hot temperatures (e.g., 50° C., ~0.4 MPa). In addition to the 2W-SME, the asphalt-modified sealant exhibited high ductility (~640% at 50° C., ~820% at room temperature, and ~500% at −40° C.), values that are comparable to those for other elastomeric sealants.
2. The pure sealant expanded by 106% when the temperature dropped from 60° C. to −45° C., and contracted by 101% when the temperature rose from −45° C. to 60° C.
3. The estimated price of commercially-produced sealant in accordance with prototype is ~$3.50/lb for the pure sealant, and ~$3.00/lb for the version admixed with asphalt.
4. Good fatigue resistance was seen even at the very low temperature of −35° C. There was no sign of fatigue failure under a cyclic strain of −30%~30% after 8,500 load repetitions. Using the Overlay Tester at the Texas Transportation Institute, the novel sealant outperformed 13 commercially available sealants. Under cyclic loading-unloading at 20% tensile strain and 0.6° C., the sealant lasted for over 2,000 cycles with only 30-40% drop in peak load, much better than the criterion of 80% peak load drop.
5. Self-healing capability. Cracks in the sealant could be self-healed (fractured pieces restored to integrity by simple kneading), eliminating and reducing cohesive failure.
6. Good durability under environmental attacks such as UV radiation, rain, salt, or their combinations.
7. Easy installation. There was no special requirement regarding the shape of joint or crack, or regarding the installation temperature.
8. The sealant could be squeezed directly into open spaces as larger or smaller particles, without the need for tension programming (the natural outdoor temperature drop provides the tensile stress needed to trigger the 2W-SME).
9. No purpose-done tensile programming step was necessary before installation. Rather, the 2W-SMP could be triggered by environmental, weather-driven cooling, which sufficed to induced tensile stress to induce 2W-SME. This environmental, weather-driven, incidental cooling can act effectively as a "programming step," without the need for a purpose-done programming step.
10. Alternatively if a "proper" or purpose-done tensile programming step is carried out, then the 2W-SMP can exhibit both true 2W-SME (i.e., expansion upon cooling and contraction upon heating without the need for an external tensile stress), and advanced 2W-SME (i.e., expansion upon cooling and contraction upon heating under an external compressive load), properties that significantly expand the applications of this 2W-SMP to other structures and devices that need to actuate at frozen temperature with high actuation strains, such as soft robots in cold regions, or structures or devices at high altitude, deep sea, and deep space.

MODES FOR CARRYING OUT THE INVENTION

Example 1: Investigation of Polyethylene (PE) as a Candidate for a Two-Way Shape Memory Sealant Reversible actuation (expansion upon cooling and contraction upon heating) is related to the crystallinity of semicrystalline polymers. Polyethylene has high crystallinity, has low cost, is readily accessible, and is available in various molecular weights and degrees of branching (e.g. HDPE, LDPE, etc.). Therefore, the first candidate we tried was polyethylene. As it turned out, polyethylene, and other candidates initially tested, did not perform well for this purpose. Finding a suitable polymer system was not a trivial undertaking.

Our goal was to develop a system with a relatively low and wide melting/crystallization transition suitable for 2W-SME in a temperature window from −35° C. to 60° C.

We tested low molecular weight PE (number-average molecular weight $M_n$=1,700 g/mol; weight-average molecular weight/14=4,000 g/mol). Dicumyl peroxide (DCP) was used as the curing agent to crosslink PE into a stable crosslinked network (cPE). Two alternative curing conditions were tested: One was cured at 120° C. for 17 h, and the other was cured at 160° C. for 2 h. We characterized the thermal behavior (melting/crystallization behavior) of cPE samples prepared under these two conditions to examine their potential for 2W-SME. Differential Scanning calorimetry (DSC) was used to measure the melting and crystallization transition of cured PE samples. DSC scans indicated very similar thermal results with a wide melting transition with peak value (melting point) around 100° C. for both polymers. The crystallization temperature was about 90° C. for both polymers. The samples also had a wide melting transition (48° C.-109° C.). This wide melting transition could indicate a possible 2W-SME over a similar temperature range, which would be desirable for this application.

Any 2W-SME of the two cPE systems was then tested. Without any tension programming and under zero external load, no 2W-SME was noticed using a Dynamic Mechanical Analyzer (DMA). I.e., the material exhibited the positive CTE (coefficient of thermal expansion) natural to cPE. Tension programming is an efficient way to increase the crystallinity of many semicrystalline materials, i.e. strain-induced crystallization (SIC). An increase in the strain level of the reversible actuation is often seen after a large tension programming for a system with 2W-SME. Hence, tension programming was tried to train the material and to induce the 2W-SME. However, cPE samples cured under both conditions were very brittle, and the brittleness of the cPE specimen led to the material breaking upon programming. A significant problem to overcome was the brittleness of the cPE system. Strategies we tried included: 1) tuning the amount of the curing agent, dicumyl peroxide, over the range of 3 to 15 wt %; or 2) adding 10-30 wt % plasticizer dioctyl phthalate; or 3) adding 50 wt % liquid EPDM (ethylene propylene diene monomer); or 4) incorporating a small amount of carbon black in the system. The experimental results showed that of these four options, only incorporating carbon black (we used 1 wt %) in the cPE system before curing efficiently increased the ductility of cPE (to ~200% tensile strain) without breakage. With the carbon-black-modified system, training or tension programming could proceed.

The 2W-SME of a cPE system with 1 wt % carbon black was then investigated using DMA. With 180% pre-strain, no reversible actuation was observed upon gradually increasing the external tensile stress. A ~3% CTE effect was seen over the −2~96° C. temperature window. By ramping the stress to 0.0725 MPa, a slight (~1%) reversible actuation was seen for the 150% pre-deformed sample. This low level of actuation was well below the target level of ~70%. Furthermore, what little reversible actuation was seen only occurred over the temperature range of 57~96° C., while our desired target range was −35~60° C. These results indicated that the PE system was not a good candidate for a two-way shape memory sealant. We faced a significant challenge to find a more suitable system, one having a suitable two-way shape memory working temperature window and relatively large actuation.

Example 2: Investigation of a Mixture of Polycyclooctene and Trans-1,4-Polyisoprene as a Candidate for a Two-Way Shape Memory Sealant Polycyclooctene displays reversible actuation, with a melting point around 50° C. Trans-1,4-polyisoprene is a semicrystalline polymer with melting point around 60° C. Trans-1,4-polyisoprene has never been previously reported as exhibiting 2W-SME. We investigated a blend of semicrystalline polycyclooctene and trans-1,4-polyisoprene having a broad melting transition window. The blend was prepared by mixing polycyclooctene and trans-1,4-polyisoprene in chloroform at 1:1 weight ratio, with added DCP as a curing agent at different loadings (3% and 5%), followed by vacuum drying and curing at 150° C. DSC scans of two specimens prepared with different amount of DCP showed two broad melting peaks ($T_m$) (48.0° C. and 53.7° C. for 3% DCP system, and 39.1° C. and 48.0° C. for 5% DCP system) and two broad crystallization peaks ($T_a$) (18.3° C. and 31.5° C. for 3% DCP system, and 10.6° C. and 24.9° C. for 5% DCP system). The two-component blended system evidently expanded the melting and crystallization windows, especially that for crystallization. This behavior is desirable for a targeted 2W-SME over a wide temperature range. Increasing DCP loading from 3 wt % to 5 wt % shifted both the melting and crystallization windows towards lower temperatures, which may improve the sealant's low temperature performance.

The two-way shape memory effect of the polycyclooctene and trans-1,4-polyisoprene mixture cured with 3% DCP was first investigated using DMA. For a 200% tension-programmed specimen, no reversible actuation (elongation upon cooling and contraction upon heating) was observed upon gradually increasing the stress over 80 minutes. However, when the stress and the strain reached 0.8 MPa and 266%, respectively, reversible actuation was observed, with about 12% actuation. Further tension programming of the specimen to 307% strain enhanced the two-way shape memory effect to about 37% reversible actuation. Heating the sample from 1° C. to 57° C. induced 3% expansion of the specimen; and continuous heating from 57° C. to 72° C. induced 37% contraction. Likewise, cooling the sample from 72° C. to 21° C. induced 38% elongation while further cooling from 21° C. to 0° C. induced ~2% contraction. Slowing down the heating or cooling rates did not substantially influence the observed reversible actuation levels.

These results reflected a significant improvement in the reversible actuation level as compared to the PE system of Example 1. The actuation level should be sufficient to complement the expansion and contraction of concrete pavement, based on calculations. Take the coefficient of thermal expansion of concrete to be $10 \times 10^{-6}/°$ C. For example, with a 6 m long concrete pavement slab, the unrestricted displacement (contraction of the slab) for a 100° C. temperature drop is:

$$(6 \text{ m}) \times (10 \times 10^{-6}/° \text{ C.}) \times (100° \text{ C.}) = 0.006 \text{ m} \quad (1)$$

This distance, 0.006 m or 6 mm, represents the maximum displacement under normal service conditions. In actual use, the slabs cannot move completely freely. Depending on the type of base course, a factor of 0.65 to 0.8 (from stabilized base course to granular treated base course) can be applied to the calculated maximum displacement. Taking the average of 0.725; and taking a sealant contraction actuation value of 37% from the above measurements, the width of this sealant needed to allow for the contraction of this concrete slab would be 0.006 m×0.725/37%=0.0118 m=11.8 mm=0.46 inches. This value corresponds to a reasonable joint width for this type of concrete slab.

On the other hand, contraction upon heating only occurred with this mixture from 57° C. to 72° C., and elongation upon cooling only occurred in the range of 72° C. to 21° C. This mixture would not allow for concrete slab contraction in regions where the ground temperature is below 21° C. As compared to concrete expansion at high temperature, concrete contraction at low temperature tends to be more important, as it is more commonly associated with adhesive failure. For most areas, even including the U.S. Deep South, temperatures below freezing are encountered during the winter. Therefore, a problem we still faced was an unfilled need for a system with 2W-SME at temperatures below freezing. For example, in early January 2018, shortly before the original provisional priority application was filed, temperatures in Baton Rouge, La. dropped as low as 14° F., or –10° C., and remained unusually cold for several days. Together with snow and icy rain, these low temperatures induced the formation of a large number of new cracks, and many joints were widened, in both cement concrete and asphalt concrete pavement.

Example 3: Investigation of Cis-Polybutadiene as a Candidate for a Two-Way Shape Memory Sealant The melting point of polybutadiene with 98% cis content is 2° C., and its glass transition temperature is –95° C. Its simple, linear, stereoregular molecular structure suggests that the crystallinity of such a system should be high, which in turn could positively affect its 2W-SME. High cis content (98%) polybutadiene with molecular weight ($M_w$) 200,000-300,000 g/mol was purchased from Sigma-Aldrich. Its viscosity was 40 (Mooney ML 1+4 at 100° C.). The cis-polybutadiene was dissolved in chloroform with either 1% DCP or 3% DCP. Based on the DSC scans, both systems had a melting point of –10° C., and a crystallization point at –42° C. for 1% DCP system and –38° C. for 3% DCP system. The difference in peroxide content did not appear to have a significant impact on melting and crystallization transitions.

The thermomechanical behavior of the crosslinked cis-polybutadiene system was examined by DMA. For the system cured with 1 wt % DCP under 140% tension programming strain, reversible actuation was clearly seen at 0.026 MPa stress. The working temperature window ($\Delta T$) was tuned from [–36° C. to 32° C.] to [–36° C. to 42° C.], to [–36° C. to 48° C.], and to [–36° C. to 57° C.]. The elongation upon cooling (EUC) increased from 21.5% to 41.0%; and the contraction upon heating (CUH) increased from 10.6% to 24.1%. These results indicated that broadening the working temperature window should increase the actuation strain level so long as it remains within or around the melting and crystallization transitions. Within the temperature window –36° C. to 57° C., the 1% DCP cured sample displayed a creep effect of a ~15% strain increase every cycle. For the system cured with 3 wt % DCP, similar 2W-SME was observed. A clear 2W-SME was present when the sample was programmed to 106% strain under 0.021 MPa stress. The strain-reversible actuation increased upon broadening the temperature window. Within the temperature window –36° C. to 57° C., the elongation upon cooling was 48.9%, and the contraction upon heating was 15.1%. The specimen showed a ~23% strain creep every cycle. Based on data provided by Minnesota Department of Transportation, such joints should be expected to double in width after five years in service. Such a creep effect is actually desirable for joint sealant materials in many circumstances. With its broad test service temperature range (–36° C. to 57° C.) and its acceptable reversible actuation characteristics, high cis polybutadiene appeared to satisfy our target technical requirements.

Cis-polybutadiene can be purchased in large scale at a reasonable price ($1.40/lb for a 2000 lb order, and $1.05/lb for 40,000 lb order as of August 2017). Cis-polybutadiene sold under the trade names Budene® 1280, Budene® 1208, and Budene® 1207 by Goodyear Chemical were used in further studies. Their viscosities were 40, 46, and 55, respectively (Mooney ML 1+4 at 100° C.). The viscosity of cis-polybutadiene from Sigma-Aldrich was 40, which was comparable to that of Budene® 1280. The Budene 1207 and 1208 had higher viscosities, which indicated higher molecular weights (values for the molecular weights were not provided by the vendor).

We then investigated the 2W-SME of these materials. Budene® 1208 cured with 3% DCP was investigated using DMA in the working temperature range of –35° C. to 60° C. Clear 2W-SME appeared immediately after tension programming. The specimen was first programmed to 85% strain. The stress was then gradually ramped to 0.18 MPa. After running several heating and cooling cycles at 0.18 MPa, we observed 50% elongation upon cooling and 42% contraction upon heating with an 8% creep per cycle. The specimen was first programmed to 87% strain. The stress was then gradually ramped to 0.32 MPa, and we observed 93% elongation upon cooling and 76% contraction upon heating, with a 9% creep per cycle.

These results represented a significant advance towards achieving our major technical goals for the system. Specifically, this system: 1) met the working temperature range requirement, i.e., a temperature range from –30° C. to 70° C., which encompasses the temperatures encountered in most parts of the United States; 2) met the actuation requirement, i.e., 70% contraction on heating from –30° C. to 70° C., and 70% expansion when cooling from 70° C. to –30° C. Since the low temperature performance of the sealant tends to be more critical than high temperature performance, we focused on a more challenging and more realistic temperature window, –35° C. to 60° C.

Additional systems were also tested for their 2W-SMEs with different starting polymers. When Budene® 1208 was cured with 5% DCP, elongation upon cooling was 76%, contraction upon heating was 62%, and the creep effect was ~12% after one cycle under 0.11 MPa stress. When Budene® 1207 was cured with 3% DCP, the elongation upon cooling was 39%, contraction upon heating was 16%, and the creep effect was ~18% after one cycle under 0.08 MPa stress. When Budene® 1280 was cured with 3% DCP, 23% elongation upon cooling was noticed under 0.009 MPa stress. However, the contraction upon heating effect disappeared. The 2W-SME of Budene® 1208 cured with 3% DCP was better than those seen with these systems.

A temperature sweep was also acquired for the 3% DCP cured Budene® 1208 using DMA. Storage modulus, loss modulus and tan delta change with temperature were recorded. At –30° C., the modulus of the material was 196 MPa, which decreased to 66.3 MPa at 0° C. and to 0.64 MPa at 10° C. The reason is believed to be the melting of crystalline region from −30° C. to 10° C. The storage modulus stabilized even at higher temperatures up to 80° C., showing the thermal stability of the polymer in a rubbery state.

In summary, we have discovered and successfully developed an excellent cis polybutadiene-based sealant displaying superior 2W-SME over a broad temperature range from −45° C. to 60° C. We next investigated how the sealant would behave under actual service conditions or harsh environmental conditions.

Example 4: Lab Scale Service Condition Tests

In Examples 1-3, we had tension-programmed specimens to the desired strain for proof-of-concept studies. In field use, however, tension-programming the sealant prior to installation in joints is complicated and can be expensive. So we also explored whether the "environmental" thermal contraction of concrete slabs themselves could supply the tensile stress required for triggering 2W-SME, without a "purpose-done" programming step. DMA was used to simulate sealant service conditions. Joint sealant is typically installed during Spring/Summer/Fall. When winter arrives, the temperature drop would induce gradual contraction of concrete pavement. Since the sealant adheres to the concrete slab, the contraction of concrete slabs on both sides of the sealant will apply tensile stress to the sealant, which thus has similarities to tension programming. Two types of tests were conducted.

In the first test, we gradually lowered the temperature to −45° C., and at the same time gradually increased the tensile stress, simulating a real-world cooling scenario. After that, we kept the stress constant, but cycled the temperature. The 2W-SME was triggered. This result suggests that, after the first winter cold front, the 2W-SMP is trained, or programmed. Subsequent cooling and heating (e.g., daily temperature changes) exhibited the 2W-SME. In other words, there is no need to program the 2W-SMP before installation, which simplifies the use and reduces the cost of practicing the invention. Natural cooling induces sufficient programming.

In the second test, we simulated daily temperature cycling, again without any other programming. During cooling, we gradually added tensile stress to the specimen, and with heating we gradually removed the applied load. The temperature drop induced a step increase in stress of the sealant, and the strain reached ~150%. Temperature increase led to expansion of the concrete slab, and stress on the sealant was gradually released, resulting in contraction of the sealant. At the completion of each cooling/heating cycle, the stress became zero and the strain also became zero. While the thermal cycling accompanied by loading and unloading cannot be directly regarded as 2W-SME, because loading itself will cause extension and unloading itself will cause shortening, we hypothesize that the 2W-SME and the mechanical loading/unloading effect are coupled. We again conclude from this study that tension programming of sealant is not required prior to installation. Temperature drops in the concrete slab can create tensile stress in the sealant sufficient to induce the 2W-SME in the smart sealant.

Fatigue testing simulates a material's service life under multiple tension and compression cycles. For sealants, lower environmental temperatures will generally shorten the time until fatigue failure. A temperature −35° C. was used for our fatigue failure testing. The specimen was subjected to a cyclic strain of −30% to 30% for 8,500 load repetitions. A temporary increase in temperature occurred every few hours, as a result of liquid nitrogen refilling in the DMA machine. After 8,500 cycles, only a slight stress decrease was observed, presumably due to structural relaxation. No other sign of fatigue failure was observed in this test.

Example 5: Investigation of the UV Stability of a Prototype Smart Sealant

UV stability is important for most sealant uses. For example, the top layer of sealant deployed in asphalt/concrete pavement joints/cracks will often be directly exposed to sunlight. For a UV light stability test, an IntelliRay 600 UV system was used. The system supplies UV radiation to a sample in the destructive region from 295 nm to 385 nm at intensity of ~174 mW/cm$^2$. To roughly convert the UV light test time to actual service life, the total absorbed UV light energy in the test was compared to the annual solar radiant exposure reported for south Florida, ~280 MJ/m$^2$. With UV test temperature at 65° C. versus a daytime average pavement surface temperature of 48° C. in south Florida, 15 h in the artificial UV stability test roughly equaled one year of service life.

With the DCP-cured Budene® 1208 system, a 30 h IntelliRay UV system exposure (~2 year service based on calculation) led to the hardening and brittleness of the test specimen, and ~90% loss in 2W-SME. We noted that the specimen in the test holder was completely exposed to the UV light. In real applications, the majority of the sealant is protected from UV exposure by concrete/asphalt pavement. Therefore, this UV exposure test was likely much harsher than actual field conditions.

Even so, there remains a need to improve the UV stability of the smart sealant. Our first effort to improve UV stability was to replace the DCP curing system with a sulfur curing system. Synthetic rubbers are generally cured either with a peroxide-based system or a sulfur-based system. We tested a sulfur-based curing system with the following formulation:

| Component | Budene® 1208 | Sulfur | TBBS | ZnO | Stearic acid | Carbon black |
|---|---|---|---|---|---|---|
| phr | 100 | 1.7 | 2 | 5 | 2 | 5 |

Notes:
"phr" denotes parts per hundred parts rubber, by weight. "TBBS" denotes N-tert-butyl-benzothiazole sulfonamide, a rubber accelerator.

The sulfur-cured Budene® 1208 system was prepared with a Modular Torque Rheometer under solvent-free conditions. Its 2W-SME was studied with DMA. Under 0.019 MPa stress, 44% elongation upon cooling and 6% contraction upon heating were observed, with a 32% creep effect per cycle. After 45 h UV exposure in the IntelliRay UV system (equivalent to ~3 years sun exposure), the 2W-SME was tested again. With the step increase in stress, the 2W-SME of the specimen increased. During the last two thermomechanical cycles, under a stress of 0.6 MPa, 15% elongation upon cooling and 9% contraction upon heating were observed. A hardening effect was seen when comparing the stress needed to trigger the 2W-SME for the specimen before and after UV exposure (0.019 MPa to 0.6 MPa applied stress). The reversible actuation values of the sulfur-cured system before UV exposure were lower than those of the DCP cured system. However, a significant degree of 2W-SME was retained for the sulfur cured system. Additional measures can be taken to further improve the UV stability, such as incorporating one or more of various UV stabilizers known in the art. The 2W-SME of the sealant should be maintained, while UV stability is thus enhanced.

Another approach to increase the UV stability of the smart sealant is to incorporate stabilizers. Previously, a sealant that had been prepared with crosslinked cis poly(1,4-butadiene) (cPBD) had become yellowish and brittle after two-year service when tested with the IntelliRay 600 UV system. UV stabilizers including Tinuvin 770, Tinuvin 900, Irganox 1076 and Irgafos 168 (2 wt % each) were added to the system during the polymer solution step, along with 3 wt % curing agent DCP. After solvent evaporation, the specimen was cured at 150° C. for 60 min. The cured specimen was then subjected to a UV treatment simulating four-year service in sunlight. The two-way shape memory effects (2W-SME) of a cured specimen and a UV treated specimen were tested afterwards using DMA.

The cured specimen showed high reversible actuation, with 147% elongation upon cooling (EUC), 141% contraction upon heating (CUH), and only 6% creep after one thermomechanical cycle when the tensile load was 0.64 MPa. After four-year simulated service, the specimen still displayed 106% EUC, 105% CUH, and only 1% creep when the tensile load was 0.64 MPa. Therefore, these results show that at least some of the commonly used UV stabilizers known in the art can improve the UV stability of the novel smart sealant.

A low-cost strategy to increase UV stability is to add ordinary asphalt directly into the sealant. Polymer-modified asphalt can also be used as a sealant due to its low cost, good adhesion with concrete, and ease in application by hot pouring. Simply applying a thin film of asphalt onto cPBD would not impart good UV protection. We instead dissolved asphalt in the solvent along with PBD during the sample preparation step. A series of specimens with PBD content varying from 30 wt % to 80 wt % was prepared and tested for 2W-SME and UV stability. Tinuvin 770, Tinuvin 900, Irganox 1076, or Irgafos 168 at 2 wt % each were incorporated into the specimens tested. 3 wt % DCP was used to cure the specimens at 150° C. for 45 min.

Results for a sealant with PBD:asphalt=80:20 (wt %) showed 150% EUC, 140% CUH, and 10% creep after one thermomechanical cycle were seen under 0.42 MPa tensile load. The working temperature range of the 2W-SME was at least −60° C. to 60° C. The specimen after UV treatment (equivalent to five-year service) showed 125% EUC, 122% CUH, and 2% creep for the last two cycles were then achieved under 0.38 MPa tensile load. Compared to UV stabilizers alone, asphalt increased stability under UV treatment.

Results for a sealant with PBD:asphalt=30:70 (wt %) showed a drop in the reversible actuation with only 22% EUC, 12% CUH, and 11% creep for the last two cycles were achieved under 0.09 MPa external tensile load. The specimen became softer and the creep effect increased dramatically following heating over 30° C. with a tensile load of 0.09 MPa. After 5 years simulated UV exposure, 35% EUC, 16% CUH, and 33% creep for the last two cycles under 0.15 MPa tensile load was seen. The working temperature range of the 2W-SME test was −50° C. to 40° C. This set of experiments indicated that for specimens with lower PBD content and higher asphalt content, UV exposure is somewhat equivalent to post-curing, having a positive overall effect on the specimens. Incorporating asphalt into the smart sealant does sacrifice some of the reversible actuation of the cPBD. However, that sacrifice is more than offset by the value of the UV protection enhancement and cost reduction resulting from incorporation of asphalt into the mixture. The softness and higher creep for sealant with higher asphalt content can be ameliorated by increasing the cure time.

We expect that by dispersing the smart polymer into an asphalt matrix, the smart polymer will not only be better protected from UV radiation by the asphalt, but the mixture should be improved overall as a product for sealing cracks in asphalt pavement, or for contraction joints in cement concrete pavement. Optionally a solvent-containing liquid asphalt, such as cutback, asphalt emulsion, foamed asphalt, etc. may be employed to enhance convenience of installation. With the dilution by asphalt, there will be some decrease in the sealant's 2W-SME. However, the 2W-SME performance of the pure polymer surpasses what is typically required for cracks or contraction joints in pavement, allowing acceptable 2W-SME even with some dilution.

Example 6: Investigations into the Feasibility of Scale-Up for Mass Production

Preparing specimens with a solvent-based protocol is often acceptable for laboratory-scale studies, but would be inefficient for industrial production, for which other approaches are better suited. For some experiments we employed a HAAKE™ PolyLab™ QC Modular Torque Rheometer, which is a scaled down mixing device with functions comparable to those of machines used in the rubber industry. The scale-up of the present invention can be tested with devices such as this. Reagents are sheared in a mixing chamber with two counter rotating rotors at 3:2 speed ratio to create a flow/shear field. The mixing chamber has 300 g capacity and features temperature control functionality. The torque range is 0-300 Nm and the speed range is 0-200 rpm. Most of our specimens can be efficiently mixed/prepared within 5-20 min. The rheometer mixing step will substitute the reagents dissolving and solvent evaporating process. It saves time, saves solvent, and is more environmental friendly. The oven curing step to form a crosslinked network is still needed after rheometer mixing.

Two specimens were prepared with the torque rheometer to demonstrate the workability of the machine. The first sealant specimen had an 80:20 PBD:asphalt (wt %) ratio, and the curing agent DCP concentration was 3 wt %. The mixture was prepared in the rheometer for 10 min at 30 rpm at room temperature and cured in an oven at 150° C. for 45 min. The 2W-SME plot showed 129% EUC, 126% CUH, and 2% creep under 0.49 MPa tensile load. The results were comparable with those for the sealant prepared by the solvent-based protocol.

The second sealant specimen had a 30:70 PBD:asphalt (wt %) ratio, and the DCP content was 3 wt % of PBD plus asphalt. The mixing time was increased to 40 min at 30 rpm at room temperature, and the curing time was increased to 2 h at 150° C. due to the higher asphalt content. For the last two cycles 17% EUC, 10% CUH, and 7% creep were seen with 0.38 MPa tensile load. Due to higher asphalt content, the working temperature range tested was −40° C. to 20° C.

These experiments showed the workability of the rheometer and the feasibility of scaling-up the formulation for mass production. This sealant composition is best suited for colder regions. For warmer regions, the asphalt proportion will be tuned accordingly.

mixtures were then cured at the selected temperature and time. See Table 2. Both at room temperature and at −40° C., higher PEVA content led to higher tensile strength. However, the ultimate tensile strain decreased significantly at −40° C. Based on our estimates, a 200% tensile strain at −40° C. should be sufficient for the sealant to survive under severe weather fluctuations. Therefore, incorporating PEVA in the sealant system is not preferred.

TABLE 2

Tensile tests of sealant specimens with varying PEVA content.

| Specimen (the rest is asphalt) | Curing agent (wt %) | Curing condition | Tensile test temperature | Tensile strength (MPa) | Ultimate tensile strain (%) |
| --- | --- | --- | --- | --- | --- |
| 25% PBD + 5% PEVA | 5 | 1.5 h at 150° C. | R.T. | 0.35 | 840 |
| 20% PBD + 10% PEVA | 5 | 1.5 h at 150° C. | R.T. | 0.80 | 592 |
| 20% PBD + 10% PEVA | 5 | 1.5 h at 150° C. | −40° C. | 5.10 | 171 |
| 20% PBD + 20% PEVA | 5 | 1.5 h at 150° C. | R.T. | 0.94 | 726 |
| 20% PBD + 30% PEVA | 5 | 1.5 h at 150° C. | R.T. | 1.62 | 724 |
| 20% PBD + 30% PEVA | 5 | 1.5 h at 150° C. | −40° C. | 13.96 | 52 |
| 20% PBD + 40% PEVA | 5 | 1.5 h at 150° C. | R.T. | 1.78 | 1054 |
| 20% PBD + 40% PEVA | 5 | 45 min at 150° C. | −40° C. | 18.00 | 117 |

Class C fly ash is a waste product from the combustion of subbituminous and lignite coals. When used as a Portland cement replacement, it can increase long-term compressive strength, decrease permeability, and reduce cost ($80/ton for Portland cement vs. $30/ton for fly ash). Incorporating class C fly ash into the cured polybutadiene system can increase the mechanical strength and lower cost. However, reduced 2W-SME with added fly ash is a potential concern. For a proof-of-concept experiment, 20 wt % class C fly ash was compounded with polybutadiene together with the curing agent DCP (3 wt %) at 60° C. using a HAAKE™ PolyLab™ QC Modular Torque Rheometer. After curing, the 2W-SME was investigated using DMA. Under 0.017 MPa stress, 23% elongation upon cooling and 6% contraction upon heating was observed, with a creep effect of ~11% after every cycle. By comparison, ~40% reduction in elongation upon cooling was noticed. These results indicated that at least some 2W-SME can be maintained with added fly ash. The 2W-SME performance and price of the sealant are affected by changing the loading of the fly ash. Adding fly ash to the composition provides additional options for users, depending on one's particular needs.

Example 7: Tensile Tests

Tensile stress and tensile strain at different temperatures are important parameters for sealants. Tensile tests for a large group of smart sealants at room temperature, −40° C., and 50° C. were conducted using the material testing system (MTS). Each specimen was tightly clamped and stabilized at the selected temperature before the tensile test began. Engineering stress vs. engineering strain was plotted.

An efficient way to increase the tensile strength of the sealant is by mixing polyethylene vinyl acetate (PEVA) with PBD and asphalt to prepare a co-cured sealant system. Varying amounts of PBD, PEVA, and asphalt with 5 wt % curing agent DCP were pre-mixed in the rheometer. The A minimum of 30 wt % polymer should be incorporated in the sealant to promote ~30% two-way reversible actuation (e.g.: >30% PBD; or 20% PBD plus 10% PEVA). After excluding PEVA, either 30% PBD (Table 3) or 40% PBD (Table 4) sealants were cured with different amount of DCP at selected cure times. Only PBD contents are listed in the Tables and the remaining percentage was asphalt. The tensile strength of each entry is listed. Lower curing times sufficed when the DCP content increased. Even at −40° C., sufficient ultimate tensile strain can be achieved, much better than sealants containing PEVA (Table 2).

TABLE 3

Tensile tests of 30% PBD sealants with varying DCP content and cure times.

| Specimen (the remainder was asphalt) (wt %) | Curing agent (wt %) | Curing condition | Tensile test temperature | Tensile strength (MPa) | Ultimate tensile strain (%) |
| --- | --- | --- | --- | --- | --- |
| 30% PBD | 3 | 2 h at 150° C. | R.T. | 0.53 | 448 |
| 30% PBD | 3 | 1.5 h at 150° C. | R.T. | 0.58 | 672 |
| 30% PBD | 3 | 1.5 h at 150° C. | −40° C. | 10.40 | 463 |
| 30% PBD | 5 | 1.5 h at 150° C. | R.T. | 0.61 | 202 |
| 30% PBD | 5 | 1 h at 150° C. | R.T. | 0.51 | 552 |
| 30% PBD | 5 | 1 h at 150° C. | −40° C. | 8.67 | 584 |

A series of specimens with different curing agent (DCP) content and cure time were prepared for 40% PBD sealants. Tensile tests at room temperature (R.T.), −40° C., and 50° C. were conducted with MTS (Table 4). The results suggested that: 1) vacuum-cured specimens had greater tensile strength, greater ultimate tensile strain, or both; 2) prolonging the cure time slightly, to 95 min, had positive effects on both tensile strength and ultimate tensile strain; 3) increasing curing agent content to 5 wt % had only a small effect on ultimate tensile strain for a fully cured specimen. Therefore, sealant with 40% PBD and 3% DCP, vacuum-cured at 150° C. for 95 min is one of the preferred embodiments, having sufficient 2W-SME (~40%), good tensile strength and ultimate strain over a wide temperature range, and a reasonable cost.

TABLE 4

Tensile tests of 40% PBD sealants with varying DCP contents and curing conditions.

| Specimen (the remainder was asphalt) (wt %) | Curing agent (wt %) | Curing condition | Tensile test temperature | Tensile strength (MPa) | Ultimate tensile strain (%) |
|---|---|---|---|---|---|
| 40% PBD | 3 | 1.5 h at 150° C. | R.T. | 0.65 | 494 |
| 40% PBD | 3 | 1.5 h at 150° C. (vacuum) | R.T. | 0.90 | 820 |
| 40% PBD | 3 | 1.5 h at 150° C. | −40° C. | 8.00 | 504 |
| 40% PBD | 3 | 1.5 h at 150° C. | 50° C. | 0.40 | 257 |
| 40% PBD | 3 | 1.5 h at 150° C. (vacuum) | 50° C. | 0.36 | 640 |
| 40% PBD | 3 | 95 min at 150° C. | R.T. | 0.72 | 839 |
| 40% PBD | 3 | 95 min at 150° C. | 50° C. | 0.42 | 762 |
| 40% PBD | 5 | 1.5 h at 150° C. | R.T. | 0.70 | 617 |
| 40% PBD | 5 | 1.5 h at 150° C. | −40° C. | 11.90 | 709 |
| 40% PBD | 5 | 1 h at 150° C. | R.T. | 0.44 | 688 |
| 40% PBD | 5 | 1 h at 150° C. | −40° C. | 13.10 | 657 |

Example 8: Adhesion Between Sealant and Concrete

We next investigated how to securely adhere the smart sealant to concrete. Cured PBD systems generally lose hot-pour ability. Pre-cured sealant with less than 10% polymer content can generally be hot-poured. An adhesive made by shear-mixing 7.5% cPBD with 92.5% asphalt was hot-poured into the concrete-sealant gap to bond the two together. The sealant[2] in the middle of the "sandwich" had a composition of 20% PBD, 10% PEVA, 70% asphalt and 3% DCP. The sealant[3,4] had less polymer content (detailed composition given in Table 5). The sandwich specimens were all placed in between concrete blocks and heat was applied to melt/soften the asphalt portion so that the smart sealant adhered to the concrete blocks.

However, based on the results listed in Table 5, the asphalt used in the experiment, the sealer itself, the sealant[2] with sealer, and the two sandwiched specimens all had poor ultimate tensile strain and tensile strength at −40° C. The route of using sealer or low PBD containing sealant as the adhesive for bonding is thus not preferred.

TABLE 5

Tensile tests of asphalt, sealer, and sandwich specimens.

| Specimen | Curing condition | Tensile test temperature (° C.) | Tensile strength (MPa) | Ultimate tensile strain |
|---|---|---|---|---|
| PG 58-34 asphalt | N/A | −40 | 0.79 | 0.1 mm |
| adhesive[1] | N/A | −40 | 0.81 | 0.1 mm |
| adhesive[1] + sealant[2] + adhesive[1] | 2 h at 150° C. for sealant | −40 | 0.6 | 8.6% |
| sealant[3] + sealant[2] + sealant[3] sandwich | 1.5 h at 150° C. (co-cure) | −40 | 0.7 | 5% |
| sealant[4] + sealant[2] + sealant[4] sandwich | 2 h at 150° C. (co-cure) | −40 | 0.93 | 1% |

[1]This adhesive was prepared by shear mixing 7.5% cPBD in 92.5% asphalt.
[2]This sealant had the composition of 20% PBD, 10% PEVA, 70% asphalt and 3% DCP.
[3]This sealant had the composition of 5% PBD, 2.5% PEVA, 92.5% asphalt and 0.75% DCP.
[4]This sealant had the composition of 10% PBD, 5% PEVA, 85% asphalt and 1.5% DCP.

Different commercial available glues were then tried to adhere sealant to concrete, including Loctite™ premium max (a silane modified polymer-based adhesive), Loctite™ Go2, Gorilla™ glue, super glue (an alkyl cyanoacrylate, such as methyl 2-cyanoacrylate or ethyl 2-cyanoacrylate), other acrylate adhesives, PU, and epoxy. Results are listed in Table 6. Based on the observations and test results, we found that most adhesives had excellent bonding strength with concrete, but unfortunately not with the smart sealant. Of the adhesives tested, the super glue had the best adhesion with the sealant at room temperature, and the Loctite™ premium max performed best at −40° C.

TABLE 6

Tensile tests of concrete sandwich specimens prepared with different PBD content and different adhesives.

| Specimen (the remainder was asphalt) (wt %) | Curing agent (wt %) | Curing condition | Glue | Tension test temperature | Tensile strength (MPa) | Ultimate tensile strain (%) |
|---|---|---|---|---|---|---|
| 30% PBD | 5 | 1 h at 150° C. | Loctite max | R.T. | 0.06 | 24 |
| 40% PBD | 5 | 1 h at 150° C. | Loctite max | R.T. | 0.10 | 9 |
| 50% PBD | 5 | 1 h at 150° C. | Loctite max | R.T. | 0.12 | 12 |
| 30% PBD | 5 | 1 h at 150° C. | Loctite max | −40° C. | 0.28 | 7 |
| 40% PBD | 5 | 1 h at 150° C. | Loctite max | −40° C. | 0.79 | 1 |
| 50% PBD | 5 | 1 h at 150° C. | Loctite max | −40° C. | 1.94 | 1.5 |
| 30% PBD | 5 | 1 h at 150° C. | Super glue | R.T. | 0.30 | 578 |
| 40% PBD | 5 | 1 h at 150° C. | Super glue | R.T. | 0.23 | 33 |
| 50% PBD | 5 | 1 h at 150° C. | Super glue | R.T. | 0.39 | 59 |
| 30% PBD | 5 | 1 h at 150° C. | PU | R.T. | 0.07 | 22 |
| 40% PBD | 5 | 1 h at 150° C. | PU | R.T. | 0.09 | 24 |

Since using a single adhesive did not appear to sufficiently adhere the sealant to concrete, sufficient to allow >200% strain extension at −40° C., pre-coating the sealant surface with super glue was tried. A thin layer of super glue was applied to the sealant surface and allowed it dry under ambient condition for about 10 min. Then Loctite™ premium max was used to adhere the pre-coated sealant to two concrete blocks. These sandwiched specimens were then subjected to tensile tests. From the results shown in Table 7, great increases in both ultimate tensile strain and tensile strength were seen. The strain values in Table 7 appear smaller than those in Table 4, but this is an artifact, because high aspect ratio specimens were used in Table 4 for the sealant tensile tests, while low aspect ratio specimens were glued between concrete blocks for the adhesion tests. It may also seem surprising that the ultimate tensile strains at 50° C. were smaller than those at lower temperatures. This result was attributed to the greater impact of shear force at higher temperatures. Since the sealant will be compressed by concrete at high temperatures due to concrete expansion, this phenomenon should not present a significant problem. We observed that at −40° C., failure of test specimens was usually the result of breaking concrete, rather than the sealant or the adhesion interface. Using two adhesives should generally suffice for field-level installations.

TABLE 7

Tensile tests of concrete and pre-coated sealant sandwiches using Loctite ™ premium max as the adhesive.

| Specimen (the rest is asphalt) (wt %) | Curing agent (wt %) | Curing condition | Tension test temperature | Tensile strength (MPa) | Ultimate tensile strain (%) | note |
|---|---|---|---|---|---|---|
| 40% PBD | 5 | 1 h at 150° C. | R.T. | 0.35 | 304 | |
| 40% PBD | 5 | 1 h at 150° C. | −40° C. | 4.20 | 330 | Concrete fail |
| 40% PBD | 3 | 1.5 h at 150° C. | R.T. | 0.50 | 210 | Sample fail |
| 40% PBD | 3 | 1.5 h at 150° C. | 50° C. | 0.35 | 123 | Sample fail |
| 40% PBD | 3 | 1.5 h at 150° C. | −40° C. | 4.30 | 352 | Concrete fail |
| 30% PBD | 5 | 1 h at 150° C. | R.T. | 0.38 | 261 | |
| 30% PBD | 5 | 1 h at 150° C. | −40° C. | 2.98 | 269 | Concrete fail |
| 30% PBD | 3 | 1.5 h at 150° C. | R.T. | 0.44 | 311 | Sample fail |
| 30% PBD | 3 | 1.5 h at 150° C. | 50° C. | 0.23 | 192 | Sample fail |
| 30% PBD | 3 | 1.5 h at 150° C. | −40° C. | 3.60 | 435 | |
| 30% PBD | 5 | 1 h at 150° C. | R.T. | 0.38 | 261 | |
| 30% PBD | 5 | 1 h at 150° C. | −40° C. | 2.98 | 269 | Concrete fail |

Two commercially-available sealants were also tensile-tested for comparison (Table 8), namely Dow 888 silicon rubber and BASF PU. Silicon rubber is relatively soft over a large temperature range, and its tensile strength does not change much from room temperature to −40° C. Large ultimate tensile strain was achieved in all tests. PU did not perform as well as silicon rubber or the novel smart sealant at −40° C. Moreover, the PU/concrete sandwiches failed at the interface. Clearly, from the data in Tables 7 and 8, the novel sealant has higher tensile strength at −40° C. than do Dow 888 silicon rubber and BASF PU, indicating better performance of the novel sealant at low temperatures.

TABLE 8

Tensile tests of commercially available silicon rubber and PU sealant.

| Specimen | Tensile test temperature | Tensile strength (MPa) | Ultimate tensile strain (%) | note |
|---|---|---|---|---|
| Dow 888 silicon rubber | R.T. | 0.24 | 1178 | Silicon breaks |
| Dow 888 silicon rubber in concrete | R.T. | 0.19 | 1000 | |
| Dow 888 silicon rubber in concrete | −40° C. | 0.26 | 638 | |
| BASF PU | R.T. | 1.19 | 478 | Interface breaks |
| BASF PU in concrete | R.T. | 0.53 | 583 | |
| BASF PU in concrete | 60° C. | 0.35 | 680 | |
| BASF PU in concrete | −40° C. | 1.58 | 128 | |

Example 9: Adhesion Test and Aging Test at Texas Transportation Institute (TTI)

Based on the above studies, one preferred composition for the smart sealant is 40% PBD and 60% asphalt, vacuum cured with 3% DCP at 150° C. for 90-95 min. Such specimens were prepared for two test runs at the Texas Transportation Institute (TTI).

The first test was an adhesion test of the crack sealant using the Overlay Tester at TTI. Based on TTI specifications, over 2,000 cycles of tension loading and unloading were carried out on the specimens. The Overlay Tester is a widely recognized lab-scale test that has a good correlation with field performance. It involves a sandwich panel formed by bonding two aluminum plates with the sealant. The maximum opening displacement was 0.1 inches (20% extension strain). The loading rate was 10 sec. per cycle (5 sec. loading and 5 sec. unloading). The test temperature was varied from 0.6° C. to 10.6° C. The sealant specimen was 3 inch long by 1 inch high by 0.5 inch wide. TTI specifies that, after 2,000 loading-unloading cycles, an 80% load drop from the maximum load of the first cycle would be considered an adhesive failure.

The lowest test temperature (harshest condition) of 0.6° C. was selected and multiple runs were conducted. All specimens had a 30%-40% load drop after >2,000 loading and unloading cycles, which is far better than the specification of an 80% load drop. Super glue was used to adhere sealant onto the aluminum block. However, some specimens had no cohesive or adhesive failure at all, while others had slight debonding or adhesive failure at the sealant/mold interface. After manually damaging the cracked specimen, a partially bare aluminum surface could be seen, indicating issues during the gluing process. However, our smart sealant still passed the TTI standard since only 30%-40% load drop was seen after >2,000 loading and unloading cycles.

The second test was accelerated aging of asphalt binder using a pressurized aging vessel (PAV). Pressurized air and elevated temperature were used to simulate in-service oxidative aging of asphalt binders. The dimensions of the disk specimen were 140 mm in diameter and 3.2 mm in thickness. A stainless steel pressure vessel was designed to operate at 2.1±0.1 MPa pressure at temperatures between 90° C. and 110° C., with interior dimensions adequate to hold ten pans and a pan holder. The actual test temperature was 100° C. The temperature and air pressure inside the pressure vessel were maintained for 20 h. After the test, the specimen surface had many small bubbles, which is typical for asphalt binders. These bubbles gradually disappeared. There was almost no loss in the elasticity of the sealant after the PAV test.

Example 10: Shear Fatigue Test Under Cold Conditions

A shear fatigue test at extreme cold conditions was performed to evaluate the bonding of the sealant with concrete, and to simulate continuous heavy traffic in real applications. A double-lap shear joint configuration was used. Three concrete blocks were separated by two pieces of smart sealants. The sealants were pre-coated with super glue, and Loctite™ premium max was used to adhere the sealant onto concrete blocks. The sealant dimensions were 6.3 mm wide, 12.7 mm deep, and 12.7 mm long. The dimensions of the middle concrete block were 12.7 mm wide, 12.7 mm deep, and 12.7 mm long. The dimensions of the substrate concrete blocks were 12.7 mm wide, 12.7 mm deep, and 25.4 mm long. For the shear fatigue test, repeated compressive loading and unloading were applied to the middle concrete block. Engineering shear stress (τ) and engineering shear strain (Y) were calculated from the relations:

$$\tau = \frac{F}{2A}$$
$$Y = \frac{\delta}{T}$$

where F is the compressive load, A is the sealant-concrete contact area, δ is the vertical displacement, and T is the sealant thickness. In hot weather, the expansion of the concrete will generate transverse compressive load to the sealant. Therefore, a C-clamp was used to compress the sandwiched specimen at 2% strain in the transverse direction before the shear test. The sealants were PBD/asphalt at 40/60 (wt %), and the sealants were cured at 150° C. for 1.5 h by using 3 wt % DCP.

The shear strain held at 60% for each compressive loading, while the shear stress fluctuated a little, most likely due to the slight temperature fluctuation within the chamber. At the end of the 600 cycles of loading and unloading with an average of 60% shear strain, no sign of failure was observed.

Example 11: Effect of Moisture Change in Pavement on the 2W-SME of the Sealant

In both cement concrete and asphalt concrete, moisture changes cause volume changes, viz., expansion by wetting and shrinkage by drying. This is especially an issue for cement concrete because water participates in the hydration process of cement, which typically causes daytime shrinkage. However, this is an issue mainly in early stages of concrete life—setting and hardening, or curing. This is why various types of joints are introduced during the early stage of cement curing, so that dry shrinkage will cause cracking at pre-designated locations, i.e., controlled or managed cracking. In pavement or bridge construction, moisture-induced volume change is often mitigated by curing in a moist environment. Sealant is usually installed after several days of curing to reduce the impact of moisture-induced volume change during early days of curing. However, during service, concrete pavements also suffer from moisture change and thus volume change. Typically, for cured concrete, the linear coefficient of moisture contraction is about $2 \times 10^{-4}$ if the concrete goes from water-saturated to fully-dry. In the "real world," a change of this magnitude would be unusual, because the concrete pavement would need to be underwater for months to achieve saturation, and then to be baked at high temperature (for example at 150° F. for 7 days). However, for the purpose of demonstration, we use a "worst case" scenario in the following calculation. Assuming that the concrete pavement slab is 6 meters long, and the linear coefficient of moisture expansion is $2 \times 10^{-4}$, the expansion of the concrete slab from moisture-free to full saturation is:

(6 m)×(2×10$^{-4}$)=0.0012 m=1.2 mm

This is the maximum linear expansion if the concrete slab is free to move. For "real world" applications, the slabs ordinarily cannot move freely. They are constrained, for example by a base layer. Depending on the type of base layer, a factor of 0.65 to 0.8 (from stabilized base to granular treated base) can be applied to the calculated sealant displacement. Taking an average of 0.725 as an estimate, the expected expansion of the concrete slab is about 1.2 mm×0.725=0.87 mm. For a reasonable 12.7 mm wide joint or crack, the induced compression strain in the sealant is 0.87 mm/12.7 mm=6.8%. For both the 2W-SMP and the asphalt modified 2W-SMP, compression up to at least 50% can occur without failure. Therefore, the moisture induced volume expansion should be tolerated by the sealant.

If the concrete slab loses moisture, it shrinks. Based on the above calculation, the maximum shrinkage for a 6 m long slab is 0.87 mm, and a 12.7 mm wide sealant experiences a tensile strain of 6.8%. Our test results shows that the 2W-SMP can be stretched to over 1,500% without failure at room temperature and many-fold without fracture at −40° C. Again, this suggests that the novel sealant should perform well under moisture changes.

A similar analysis could be performed for asphalt pavement. However, due to the hydrophobic behavior of asphalt, the moisture-induced volume changes are smaller than those with cement concrete. Therefore, we conclude that the sealant should also perform well under moisture-changes for asphalt concrete pavement.

Example 12: Durability Against De-Icing Salts

De-icing salts are used in many parts of the country. As discussed in Example 4, the novel sealant was stable under a moisture attack test in rain water. In this study, we addressed its stability under salt water attack. We prepared saturated saltwater, and immersed the 2W-SMP specimens. To accelerate absorption, we kept the saltwater boiling and continuously measured the weight of the specimens until the weight stabilized. It appeared that after 30 minutes of immersion, the specimens had saturated with saltwater (no further mass change with time). After saturation, we tested the specimen using our DMA machine. The 2W-SMP exhibited excellent 2W-SME, as reflected by 129% expansion upon cooling from 60° C. to −35° C., and 111% contraction upon heating from −35° C. to 60° C. As compared to test results without saltwater, the saltwater-attacked 2W-SMP had slightly better 2W-SME, indicating the stability of the sealant under saltwater or de-icing water environment.

Example 13: Mechanistic Study—Cryogenic Scanning Electron Microscopy (SEM) Observation The mechanism underlying 2W-SME is believed to be a melting/crystallization transition within the switching phase of the 2W-SMP. To better understand the mechanism, a 2W-SNIP specimen was imaged by cryogenic scanning electron microscopy (SEM) (JEOL 7600F with Gatan Alto) using secondary electrons. The sample surfaces were coated with ~5 nm thick gold. The accelerating voltage was 5 kV, and the working distance was 8.7-8.8 mm. The Alto sample preparation chamber temperature was first brought to −60° C. and the sample was kept at this temperature for 10 min. Then the sample surface was coated with Au/Pd in situ to form a layer ~5 nm. Images were then taken at −60° C., −40° C., −20° C. and 0° C. The sample was held at each temperature for 10 min before image acquisition. At −60° C. and −40° C., nanoscale fibrous structures were clearly seen throughout the entire surface. As the temperature increased to −20° C., there was a significant reduction in the fibrous nanostructures and multiple smooth areas appeared, indicating that crystalline domains had started to melt. By 0° C., the fibrous structures had completely disappeared, indicating that the specimen was in its molten state. It is believed that the fibrous filaments represent crystalline structures. Thus the sealant experienced a crystallization/melting transition as the temperature rose.

Example 14: Mechanistic Study—In Situ X-Ray Diffraction (XRD)

To investigate the effect of tension programming on the crystallization and on 2W-SME, in situ XRD was performed with a Panalytical Empyrean diffractometer with a Cu anode. Two specimens were scanned by XRD: an as-prepared specimen, and a 200%-tensile-stretched specimen. For ease of comparison, the Y scales were set to be in the same range. All specimens experienced a cooling branch, first from 0° C. to −20° C., −40° C., and −60° C., followed by a heating branch from −60° C. to −40° C., −20° C., and 0° C. In the XRD plots, intense, narrow, sharp peaks represent a crystalline phase, while large smooth bumps distributed across a wide range of angles correspond to an amorphous region. No clear change in scattering was seen upon dropping the temperature from 0° C. to −20° C. At −40° C., a small lump at 21.9° indicated the presence of a crystalline phase. At −60° C., two sharp peaks at 18.7° and 22.2°, along with a small peak at 27.7° indicated a relatively high crystallinity for the as-prepared sample. Heating from −60° C. to −40° C. led to barely any change, which indicated the absence of crystal melting from −60° C. to −40° C. A clear peak intensity drop was observed by continuously heating the specimen to −20° C. Crystal melting was the presumptive cause, as the melting transition of the specimen was between −23° C. to −3° C. based on the DSC results. At 0° C., the specimen returned to an amorphous state and no diffraction peak was detected, suggesting that the 2W-SMP had reached an amorphous state.

The diffraction peaks for the 200% stretched specimen were sharper, and their intensities were stronger. These observations indicated that crystallinity increased with pre-stretching or with strain-induced crystallization (SIC). Crystal formation began above −20° C. Further cooling the specimen to −40° C., then −60° C., and then heating back to −40° C. had no apparent effect on crystallinity, probably because the specimens were fully crystalized at these temperatures. A slight melting was noticed when heating the sample to −20° C. The specimen returned to its amorphous state at 0° C.

This observation was consistent with the 2W-SME test results. Pre-tension programming led to higher crystallinity and thus higher 2W-SME; pre-tension programming shifted the crystallization temperature higher. The in-situ XRD observations were consistent with the proposed SIC mechanism.

Example 15: Mechanistic Study—DSC Test

In view of the semi-crystalline nature of the crosslinked specimen, we used differential scanning calorimetry (DSC) to locate the melting peak and the crystallization peak of three specimens with differing pre-strains: an as-prepared specimen, a 100%-tensile-stretched specimen, and a 200%-tensile-stretched specimen. The samples were scanned from −55° C. to 0° C. Above 0° C., no peaks could be detected. The melting transitions of the three specimens were roughly the same at −8.7° C., while the crystallization temperatures showed a clear increase with increasing pre-strain (−34.9° C. for as prepared specimen, −33.6° C. for 100% stretched specimen, and −29.5° C. for 200% stretched specimen). The measured enthalpy changes (ΔH) of the endothermic peaks are 30.3 J/g, 32.2 J/g, and 34.5 J/g for the as-prepared specimen, 100% stretched specimen, and 200% stretched specimen, respectively. The higher the pre-strain, the more the energy that was needed for the melting transition. These results echoed the X-ray and cryogenic-SEM results, i.e., they were all consistent with a strain-induced crystallization mechanism.

Example 16: Mechanistic Study—Raman and Fourier-Transform Infrared Spectroscopy

The goal of this study was to determine whether programming induced any bond length changes. If a bond length changes, energy might be stored in the form of an enthalpy increase. If the bond length does not change, energy might be stored instead as an entropy decrease. Three specimens of as-prepared, 100%-tension-stretched, and 200%-tension-stretched samples at room temperature were scanned by Raman spectroscopy. No clear differences were noticed among the three spectra. Signature peaks appeared for all three spectra, including C=C stretching at 1652 $cm^{-1}$, =C—H stretching at 3010 $cm^{-1}$, $CH_2$ asymmetric stretching at 2900 $cm^{-1}$, $CH_2$ stretching at 2852 $cm^{-1}$, C—C stretching at 990 $cm^{-1}$, and $CH_2$ in-plane deformation at 1262 $cm^{-1}$. Because these tests were carried out at room temperature, the crosslinked cis-polybutadiene was in a molten state, and no chemical bond changes or structural changes would have been expected. In other words, the energy was evidently stored in the form of an entropy decrease. Similar results were seen with Fourier-Transform Infrared Spectroscopy (FT-IR) spectra when comparing as-prepared and 200%-stretched specimens at room temperature. No clear difference was noticed. Signature peaks appeared for both spectra, including=C—H stretching at 3004 $cm^{-1}$, $CH_2$ asymmetric stretching at 2939 and 2849 $cm^{-1}$, C=C stretching at 1655 $cm^{-1}$, and $CH_2$ in-plane deformation at 1449 $cm^{-1}$. The spectra suggested that there were no chemical bond changes resulting from stretching the specimen to 200% strain in the melted state.

Example 17: True 2W-SME

Conveniently, the 2W-SMP can be "trained" through naturally-occurring, ambient cooling. However, if the sealant happens to debond from the concrete wall, the tensile stress cannot be transferred to the sealant during natural cooling, and in such a case the 2W-SMP would not be trained or programmed. On the other hand, if the 2W-SMP were programmed before installation, possible debonding from the concrete wall would not cause loss of 2W-SME. Accordingly we studied the 2W-SME when the applied stress was zero, the so called "true" 2W-SME.

The specimen was first tensile-programmed to 145% strain. The specimen was then unloaded to zero stress. Afterwards, the temperature was swept from −50 to −5° C., −50 to −4° C., or −50 to −2° C., none of which induced any 2W-SME. However, when the temperature window was expanded to −50 to 1° C., true 2W-SME was seen, with 3.7% expansion upon cooling and 3.0% contraction upon heating. Increasing the upper limit of the temperature window further, to 7° C., led to a large strain reduction (shape recovery). These results showed that this sealant displayed true 2W-SME, within certain temperature ranges.

Example 18: Advanced 2W-SME

Quasi 2W-SME under external tensile load, and true 2W-SME without external load are discussed above. However, "advanced" 2W-SME under compressive load had not been investigated. "Advanced" 2W-SME is that which occurs where a material expands upon cooling, notwithstanding that the material is simultaneously subjected to a compressive load. The specimen was first programmed with a fixed strain of 76.9%. After that, a compressive stress of 0.0002 MPa was applied to the specimen, and the specimen was subjected to thermal cycles. Three cycles demonstrating advanced 2W-SME could be clearly seen. The contraction upon heating (CUH) values and the elongation upon cooling (EUC) values are summarized in Tables 9 and 10, respectively. Upon holding the low temperature fixed (−45° C.), and increasing the high temperature from −0.5° C. to 2.6° C. to 3.1° C., the CUH and EUC values both increased (Table 9). In the second test, the compressive load was gradually increased from 0.02 MPa to 0.05 MPa to 0.12 MPa. Elongation upon cooling (EUC) was seen in the first two cycles. However, advanced 2W-SME was not seen for the third cycle, for reasons that remain unclear. That anomaly may be due to the shape recovery upon third heating (CUH=111.7%). A full shape recovery melts the stable network (crystallites), and thus the effect of tensile programming may disappear.

To our knowledge, this represents the first report of a two-way shape memory polymer composition that exhibits an advanced two-way shape memory effect. These novel properties will be useful for applications other than sealants, for example as actuators. In summary, the novel 2W-SMP demonstrated each of the three following properties: (1) quasi 2W-SME (expansion upon cooling under a constant external tensile load); (2) true 2W-SME (expansion upon cooling, without external load); and (3) advanced 2W-SME (expansion upon cooling under a constant external compressive load).

TABLE 9

Advanced 2W-SME of the sealant under 0.0002 MPa compression load.

| Cycle | CUH (%) | EUC (%) | Compressive load (MPa) |
|---|---|---|---|
| 1 | 2.6 | 0.7 | 0.0002 |
| 2 | 10.2 | 2.7 | 0.0002 |
| 3 | 20.3 | 3.6 | 0.0002 |

TABLE 10

Advanced 2W-SME of the sealant under 0.02 MPa, 0.05 MPa, and 0.12 MPa compression load.

| Cycle | CUH (%) | EUC (%) | Compressive load (MPa) |
|---|---|---|---|
| 1 | 26.1 | 6.7 | 0.02 |
| 2 | 17.9 | 6.2 | 0.05 |
| 3 | 111.7 | 0 | 0.12 |

Example 19: 2W-SME of Crosslinked Budene® 1208 Over Various Temperature Ranges The melting and crystallization temperatures of the crosslinked Budene® 1208 are both below 0° C. However, based on our previous 2W-SME tests, high 2W-SME (reversible actuation) can be seen when sweeping the temperature above 0° C. To better understand the mechanism, we investigated the temperature influence on the reversible actuation. The highest temperature ($T_{high}$) and the lowest temperature ($T_{low}$) are listed in Table 11. The external tensile stress was 0.19 MPa throughout the test. For the first two thermomechanical cycles, $T_{low}$ was above the crystallization temperature of the specimen. The contraction upon heating (CUH) was 36-53%, and elongation upon cooling (EUC) was 46-65%. This suggested that the SMP had clear 2W-SME above its crystallization temperature. In other words, the 2W-SME was not due to a crystallization/melting transition, which is the recognized mechanism for semicrystalline SMPs. This is an interesting discovery because the polymer is in amorphous state in this temperature range. We believe that this observation is most likely due to the high flexibility of the molecular chains in the rubbery state; and the highly coiled configuration suggests a high entropy before programming. Under external tensile force, the coiled molecules tended to align along the loading direction, and may undergo a significant reduction in entropy. Although the molecules or segments do not have long-range order (crystallites), nevertheless short range order, or quasi-crystal or mesogen structures may form, which leads to EUC. We also believe the molecular origin of the high entropy in the rubbery state is due to the high cis content of this polymer. The cis configuration enables rotation of the C—C single bond after crosslinking, facilitating more conformational configurations and thus high entropy before programming, and a correspondingly high entropy reduction after programming.

For the five subsequent heating/cooling cycles, we also made an interesting observation: there was a slope change in the strain curves during both heating and cooling cycles. For the cooling cycles, the temperatures at the turning points ($T_{turn}$) were from −24 to −25° C., which was around the crystallization temperature of the specimen. Below the $T_{turn}$ in the cooling cycles, the slopes of the strain curves increased, indicating greater contribution of crystallization induced elongation. For the heating cycles, the specimen first expanded slightly before reaching its melting point, most likely due to positive thermal expansion, as seen in Example 21. Then CUH with a steeper slope occurred, due to the greater contribution of melting-induced contraction. After the temperatures reached about 4.5 to 7° C., the slope of the strain curves decreased. The continuous contraction after $T_{turn}$ was due to entropic elasticity. The reversible actuation of the first two thermomechanical cycles was thus attributed to entropic elasticity, and the subsequent temperature cycles showed combined effects from entropic elasticity and crystallization/melting.

TABLE 11

2W-SME study of crosslinked Budene® 1208 within different temperature ranges under a fixed tensile stress of 0.19 MPa

| $T_{high}$ (° C.) | $T_{low}$ (° C.) | CUH (%) | EUC (%) | $T_{turn}$ (° C.) | Δε before $T_{turn}$ (%) | Δε after $T_{turn}$ (%) |
|---|---|---|---|---|---|---|
| 61 | −9 | 36 | 46 | N/A | N/A | N/A |
| 61 | −20 | 53 | 65 | N/A | N/A | N/A |
| 61 | −32 | N/A | 97 | −25 | 68 | 29 |
| 83 | −32 | 98 | N/A | 7 | 38 | 60 |
| 83 | −45 | N/A | 132 | −25 | 99 | 33 |
| 89 | −45 | 119 | N/A | 4.5 | 34 | 85 |
| 89 | −45 | N/A | 149 | −24 | 113 | 36 |

Example 20: One-Way Shape Memory Effect (1W-SME) of Crosslinked Budene® 1208

1W-SME of crosslinked Budene® 1208 was investigated to better understand the 2W-SME behavior above the specimen's crystallization temperature (>−29.5° C.). See Table 12. An optimized load (0.21 MPa) was added to the specimen at 60, 20, −20, and −45° C., each for 120 min. −45° C. was also used to evaluate whether the crystallization region could exhibit 1W-SME. The lengths, programmed strains, and recovery ratios are listed in Table 12. At the same load for 120 min, the higher the environmental temperature, the higher the programming strain and the higher the fixed strain. The recovery ratios for tests at 60, 20, and −20° C. were fairly good, over 90%, indicating cis polybutadiene has a high 1W-SME performance in its amorphous state. When the temperature was lowered to −45° C., well below the crystallization temperature, the specimen was only tensile-programmed to 6% strain under a 0.21 MPa load. When the specimen was heated slowly at 0.5° C./min to −3.5° C., the specimen expanded 1.5%. Continuously heating the specimen from −3.5 to 4.5° C., the specimen contracted 4.5% due to crystal melting. Then, heating to room temperature induced ~2.5% expansion.

TABLE 12

Analysis of 1W-SME behavior.

| Programming Temperature (° C.) | Original length (mm) | Programmed length (mm) | Recovered length (mm) | Programmed strain (%) | Recovery ratio (%) |
|---|---|---|---|---|---|
| 60 | 6.11 | 23.14 | 7.37 | 345 | 93 |
| 20 | 5.04 | 21.98 | 6.51 | 284 | 91 |
| −20 | 4.89 | 15.75 | 5.35 | 224 | 96 |

In a similar test, after holding a 0.21 MPa stress on a specimen at 20° C. for 120 min, the load was maintained, and the temperature was swept at different temperature ranges. The results showed that the specimen displayed reversible actuation (2W-SME) in its amorphous state.

In summary, at temperatures above crystallization, the SMP demonstrated both 1W-SME and 2W-SME. A significant difference between 1W-SME and 2W-SME is in the branch of cooling. For 1W-SME, cooling is one of the steps of classical hot programming, and if tension programming has been used, the polymer usually shrinks when cooled; on the other hand, for 2W-SME, under external tensile load cooling induces expansion.

Example 21: Coefficient of Thermal Expansion

Some materials have an inherent negative coefficient of thermal expansion (NCTE), i.e., expansion upon cooling and contraction upon heating, which makes their behavior similar to that of 2W-SME. We tested whether the reversible actuation behavior for the novel sealant was in fact attributable to 2W-SME, rather than to NCTE. Zero external load and zero pre-strain (i.e., no programming) were applied. The specimen demonstrated positive CTE behavior, i.e., expansion upon heating and contraction upon cooling, as do most common materials. Within the temperature range −45 to 0° C., 0.9% expansion upon heating (CTE=2.0×10$^{-4}$/° C.) and 0.8% contraction upon cooling (CTE=1.78×10$^{-4}$/° C.) were seen. Within the temperature range −45 to 55° C., 1.8% expansion upon heating (CTE=1.8×10$^{-4}$/° C.) and 1.4% contraction upon cooling (CTE=1.4×10$^{-4}$/° C.) were observed. The slight difference between cooling and heating branches was attributed to a small creep of the polymer under gravitational force during heating. In other words, in the absence of tensile programming, the novel sealant has a positive CTE, as do most polymers.

Example 22: Energy Conversion Efficiency

Energy conversion efficiency is important for materials used as actuators, "muscles," etc. We calculated the energy conversion efficiency for a specimen of the novel sealant. A 200% tensile-programmed specimen was used in this example. (The programming level would be expected to influence the energy input and output values.) An energy conversion efficiency test was conducted on an MTS machine in tensile mode. First the specimen was tensile-programmed to 200% strain at room temperature. Then the temperature of the thermal chamber was lowered to −45° C. to fix the programmed shape. A plot of the load as a function of the displacement was integrated. The area enclosed by the recovery force—recovery displacement curve is the work done by the specimen upon other objects or output energy; while the work done upon the specimen during programming is the energy input. The mechanical energy input for the particular 200% tension programmed specimen was calculated as 32.3 mJ. To acquire data for plotting a curve of recovery force vs. displacement, 20 displacement values were selected, and the corresponding force values were recorded. The area of the curve for recovery force as a function of displacement was integrated, giving an energy output for the same 200% tension programmed specimen of 14.9 mJ. Thus the energy conversion efficiency was calculated as:

$$\text{Energy conversion efficiency} = \frac{\text{Energy output}}{\text{Energy input}} \times 100\% = \frac{14.9}{32.3} \times 100\% = 46.1\%$$

MISCELLANEOUS

Following programming a composite in accordance with the present invention with sufficient tensile stress, thereafter the composite will expand upon cooling and will contract upon heating over a certain temperature range. The preferred temperature range depends, in part, on local climate and expected temperature extremes. In some embodiments, the temperature range comprises at least the range −30° C. to +50° C. In other embodiments, the low end of the temperature range can be −50° C., −49° C., −48° C., −47° C., −46° C., −45° C., −44° C., −43° C., −42° C., −41° C., −40° C., −39° C., −38° C., −37° C., −36° C., −35° C., −34° C., −33° C., −32° C., −31° C., −30° C., −29° C., −28° C., −27° C., −26° C., −25° C., −24° C., −23° C., −22° C., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., or 0° C. In other embodiments, the high end of the temperature range can be 60° C., 59° C., 58° C., 57° C., 56° C., 55° C., 54° C., 53° C., 52° C., 51° C., 50° C., 49° C., 48° C., 47° C., 46° C., 45° C., 44° C., 43° C., 42° C., 41° C., 40° C., 39° C., 38° C., 37° C., 36° C., 35° C., 34° C., 33° C., 32° C., 31° C., or 30° C.

Some embodiments of the invention include composites comprising a cured or uncured admixture of polybutadiene and asphalt. In some embodiments, the admixture has been cured; in other embodiments the admixture is supplied uncured, and it may then be cured when desired. In some embodiments the polybutadiene comprises between 20% and 90% of the composite by mass. In other embodiments, the percentage of polybutadiene can be 5%, 10%, 15%, 20%, 25%, 30%, 35%, 40%, 45%, 50%, 55%, 60%, 65%, 70%, 75%, 80%, 85%, 86%, 87%, 88%, 89%, 90%, 91%, 92%, 93%, 94%, 95%, 96%, 97%, 98%, 99%, or 100%. In some embodiments asphalt comprises between 10% and 80% of said composite by mass. In other embodiments, the percentage of asphalt can be 0%, 1%, 2%, 3%, 4%, 5%, 6%, 7%, 8%, 9%, 10%, 11%, 12%, 13%, 14%, 15%, 20%, 25%, 30%, 35%, 40%, 45%, 50%, 55%, 60%, 65%, 70%, 75%, 80%, 85%, or 90%. In some embodiments more than 90% of the polybutadiene by mass is cis-polybutadiene. In other embodiments, the amount of cis-polybutadiene, as a percentage of all polybutadiene by mass, is 50%, 55%, 60%, 65%, 70%, 75%, 80%, 85%, 86%, 87%, 88%, 89%, 90%, 91%, 92%, 93%, 94%, 95%, 96%, 97%, 98%, 99%, or 100%.

The disclosure of U.S. patent application Ser. No. 15/032,491, filed Apr. 27, 2016, is hereby incorporated by reference in its entirety. The disclosure of U.S. provisional patent application Ser. No. 62/632,615, filed Feb. 20, 2018 is hereby incorporated by reference in its entirety. The disclosure of U.S. provisional patent application Ser. No. 62/801,731, filed Feb. 6, 2019 is hereby incorporated by reference in its entirety. The complete disclosures of all references cited herein are hereby incorporated by reference in their entirety. Also incorporated by reference is the complete disclosure of the following publication by the present inventors: L. Lu et al., "Giant reversible elongation upon cooling and contraction upon heating for a crosslinked cis poly(1,4-butadiene) system at temperatures below zero Celsius," *Scientific Reports* (2018) 8:14233, including its published Supplementary Information. See also G. Li et al., June 2018 NSF poster. In the event of an otherwise irreconcilable conflict, the present specification shall control over any material incorporated by reference.

What is claimed:

1. A composite:
(a) wherein said composite comprises a admixture of polybutadiene, a curing agent, and asphalt; wherein between 20% and 90% of said composite by mass is said polybutadiene; wherein more than 90% of said polybutadiene by mass is cis-polybutadiene; wherein said curing agent, when activated or if activated, cross-links or will crosslink said butadiene; and wherein between 10% and 80% of said composite by mass is said asphalt; and
(b) wherein said composite, if cured: possesses the capacity to exhibit a two-way shape memory effect: wherein, once said composite has been programmed with tensile stress, thereafter said composite will, if the tensile stress is maintained, expand upon cooling and will contract upon heating over a range of temperatures −30° C. to +50° C.; and wherein this property of expanding upon cooling and contracting upon heating is repeatable over multiple cycles of heating and cooling.

2. The composite of claim 1, wherein said curing agent comprises 1%-5% dicumyl peroxide; or a mixture of sulfur and N-tert-butyl-benzothiazole sulfonamide.

3. The composite of claim 1, wherein said composite has been cured, to generate crosslinked polybutadiene molecules.

4. The composite of claim 1, wherein said composite is uncured, without crosslinked polybutadiene molecules.

5. An article of manufacture comprising the composite of claim 1 and an adhesive surface layer.

6. The article of manufacture of claim 5, wherein said adhesive comprises an alkyl cyanoacrylate.

7. The article of manufacture of claim 6, additionally comprising a layer of a silane-modified polymer-based adhesive bonded to said alkyl cyanoacrylate adhesive.

8. An article of manufacture comprising a cement concrete or an asphalt concrete having a joint or crack: wherein said joint or crack is filled with the article of manufacture of claim 7, wherein said composite has been cured; wherein said silane-modified polymer-based adhesive layer adheres to the concrete to seal the joint or crack; wherein, if following programming said composite with tensile stress, thereafter said composite will expand upon cooling and will contract upon heating over a range of temperatures −30° C. to +50° C., while the concrete will, if tensile stress is maintained, expand upon heating and contract upon cooling over the same range of temperatures; so that overall the joint or crack remains sealed even when the article of manufacture experiences temperature changes within the range −30° C. to +50° C.

9. The article of manufacture of claim 8, wherein said composite has been programmed with tensile stress, so that said composite will expand upon cooling and will contract upon heating over a range of temperatures −30° C. to +50° C.

10. The article of manufacture of claim 9, wherein said composite is programmed with the tensile stress before said composite is placed within the joint or crack.

11. The article of manufacture of claim 9, wherein said composite is programmed with the tensile stress as the result of the inherent contraction of the concrete as the ambient temperature declines.

12. The composite of claim 1, wherein said composite is self-healing, wherein a crack within said composite can be repaired, and fractured pieces of said composite can be restored to integrity by kneading said composite, thereby eliminating or reducing potential cohesive failure that a crack might otherwise induce.

13. The composite of claim 3, wherein said composite possesses true two-way shape memory properties, which do not require a persistent external tensile load to maintain the two-way shape memory effect.

14. The composite of claim 3, wherein said composite possesses advanced two-way shape memory properties, which maintain the two-way shape memory effect under a persistent compressive load upon cooling.

15. A process for making the composite of claim 1, comprising the steps of dissolving the components of the composite in a common solvent, and then evaporating the solvent to produce said composite.

16. A process for making the composite of claim 1, comprising the intimate physical mixing of the components in the solid state at ambient temperature, without a liquid-phase solvent, to produce said composite.

17. A process for sealing a joint or crack in a cement concrete or an asphalt concrete having a joint or crack; said process comprising filling the joint or crack with the article of manufacture of claim 7, wherein said composite has been cured; wherein the silane-modified polymer-based adhesive layer adheres to the concrete to seal the joint or crack; wherein, if following programming the composite with tensile stress, thereafter the composite will expand upon cooling and will contract upon heating over a range of temperatures −30° C. to +50° C., while the concrete will expand upon heating and contract upon cooling over the same range of temperatures; so that overall the joint or crack remains sealed even when the concrete experiences temperature changes within the range −30° C. to +50° C.

18. The process of claim 17, wherein the composite has been programmed with tensile stress, so that the composite will expand upon cooling and will contract upon heating over a range of temperatures −30° C. to +50° C.

19. The process of claim 18, wherein the composite is programmed with the tensile stress before the composite is placed within the joint or crack.

20. The process of claim 18, wherein the composite is programmed with the tensile stress as the result of the inherent contraction of the concrete as the ambient temperature declines.

* * * * *